United States Patent
Diluna et al.

(10) Patent No.: US 12,552,016 B2
(45) Date of Patent: Feb. 17, 2026

(54) SYSTEM AND METHOD FOR PISTON RECOIL PRESSURE ADJUSTMENT

(71) Applicants: Arjun Rohan Diluna, Branford, CT (US); Sharan Rampal, Pittsgrove, NJ (US)

(72) Inventors: Arjun Rohan Diluna, Branford, CT (US); Sharan Rampal, Pittsgrove, NJ (US)

(*) Notice: Subject to any disclaimer, the term of this patent is extended or adjusted under 35 U.S.C. 154(b) by 0 days.

(21) Appl. No.: 18/942,813

(22) Filed: Nov. 11, 2024

(65) Prior Publication Data

US 2025/0153350 A1 May 15, 2025

Related U.S. Application Data

(60) Provisional application No. 63/598,111, filed on Nov. 12, 2023.

(51) Int. Cl.
*B25J 9/14* (2006.01)
*B25J 9/00* (2006.01)

(52) U.S. Cl.
CPC ............. *B25J 9/144* (2013.01); *B25J 9/0006* (2013.01)

(58) Field of Classification Search
CPC ......... B25J 9/0006; F15B 11/024; F16F 9/02; A61H 2201/1409
See application file for complete search history.

(56) References Cited

U.S. PATENT DOCUMENTS

| | | | | |
|---|---|---|---|---|
| 4,904,150 A * | 2/1990 | Svensson | ............. | B25J 19/0012 414/719 |
| 6,899,206 B2 * | 5/2005 | Antonovsky | ......... | F16F 9/0209 188/315 |
| 9,308,642 B2 * | 4/2016 | Sugar | ..................... | B25J 9/0006 |
| 10,514,048 B2 * | 12/2019 | Yamada | .............. | F16K 15/1825 |
| 2015/0182354 A1 * | 7/2015 | Bonnet | ..................... | A61F 2/70 623/26 |
| 2018/0098864 A1 * | 4/2018 | Auberger | .................. | A61F 2/64 |
| 2018/0355892 A1 * | 12/2018 | Yamada | ................ | F15B 15/149 |
| 2019/0328605 A1 * | 10/2019 | van den Bogert | ..... | B25J 9/0006 |
| 2021/0040946 A1 * | 2/2021 | Heitmann | ............. | F15B 11/024 |
| 2021/0199140 A1 * | 7/2021 | Ito | ........................ | F15B 11/024 |
| 2021/0322252 A1 * | 10/2021 | Sridar | .................... | B25J 9/0006 |
| 2023/0077722 A1 * | 3/2023 | Notohardjono | ........... | A61F 2/80 607/104 |

FOREIGN PATENT DOCUMENTS

| | | | | | |
|---|---|---|---|---|---|
| KR | 20060069634 A | * | 6/2006 | ............. | B60J 5/047 |
| KR | 20110005504 A | * | 1/2011 | ............. | F16F 9/3207 |
| WO | WO-2012045320 A1 | * | 4/2012 | ............. | B25B 5/061 |

* cited by examiner

*Primary Examiner* — Thomas E Lazo

(74) *Attorney, Agent, or Firm* — Ashok Tankha

(57) ABSTRACT

A system and a method for piston recoil pressure adjustment are disclosed. The system and the method use air compression in a piston to augment reverse motion. The system and the method contain a piston and a multi-directional valve controller. The multi-directional valve controller allows the venting of air in a first section above the piston head externally and/or to a second section below the piston head. By alternatingly opening and closing the vents, air can be pumped into the second section to increase the recoil forces. A reservoir connected to the second section below the piston head through an air retardation device serves to dampen abrupt changes of pressure during piston compression or decompression, thereby providing a relatively uniform recoil assistance.

23 Claims, 7 Drawing Sheets

SYSTEM AND METHOD FOR PISTON RECOIL PRESSURE ADJUSTMENT

CROSS-REFERENCE TO RELATED APPLICATION

This application claims the benefit of provisional patent application no. 63/598,111 titled "Recoil Piston System", filed in the United States Patent and Trademark Office on Nov. 12, 2023. The specification of the above referenced patent application is incorporated herein by reference in its entirety.

BACKGROUND

An exoskeleton is a wearable robotic device designed to assist or enhance human abilities. Exoskeletons are used to support mobility for people with disabilities, to enhance workers' strength in physically demanding jobs, by military personnel, and sports enthusiasts. Typically, exoskeletons use motors and actuators to imitate or enhance the natural movements of a human body. However, a major shortcoming of existing exoskeleton systems is their power source. To power the exoskeletons, these devices either use battery powered motors or pneumatic pistons powered by pressurized air tanks or air pumps that are cumbersome and tether users to the air supply. Furthermore, the battery life or the capacity of the pressurized air supply limit the duration of usage. Moreover, spring-based exoskeletons, while lighter, have limited flexibility since the spring force cannot be adjusted as required. Furthermore, when spring mechanisms are activated, they tend to release force abruptly, causing jerky or violent movements.

Therefore, there is a long felt need for a lightweight piston mechanism that provides inexhaustible assist power to an exoskeleton while allowing the wearer to adjust the assist force as needed. Furthermore, there is a need for the assist force to be relatively uniform to ensure smooth and natural movements for a user wearing an exoskeleton.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or that component shown by that same numeral in any subsequent drawing herein.

DETAILED DESCRIPTION OF THE INVENTION

Figure 1:
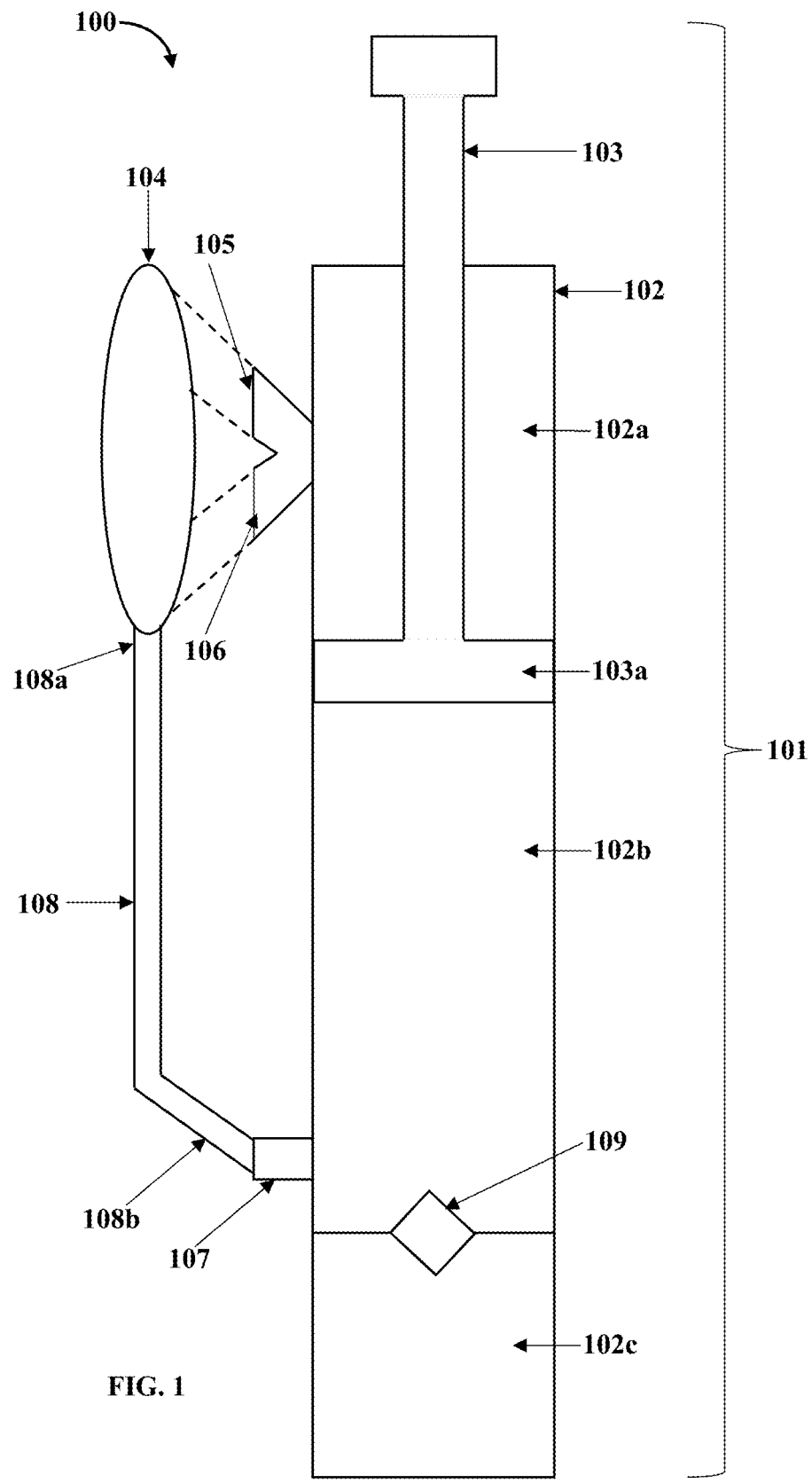
FIG. 1 exemplarily illustrates a schematic block diagram of an exemplary implementation of a system for piston recoil pressure adjustment.

FIG. 1 exemplarily illustrates a schematic block diagram of an exemplary implementation of a system 100 for piston recoil pressure adjustment. The system 100 comprises a piston 101 and a multi-directional valve controller 104. The system 100 uses air compression in a piston 101 to augment reverse motion, also known as, spring effect. As used herein, the term 'air' refers to all gases individually or in combination. The energy used to compress the piston 101 is conserved and reused to assist the piston's 101 movement in the reverse and/or opposite direction. As used herein, the term "piston movement" refers to motion of a piston rod 103 and a piston head 103a within the cylinder 102. This includes any linear or reciprocal movement of the piston 101 components as they operate to compress or release the air within the cylinder 102, driving a mechanical function of the system 100. The system 100 also enables adjustment of the piston recoil pressure. The piston 101 comprises a cylinder 102 and a piston rod 103. The variable space above a piston head 103a is referred to as a first section 102a, and the second section 102b refers to the variable space above and below the piston head 103a. The piston rod 103 is configured to move the piston head 103a within the first section 102a and the second section 102b of the piston 101. The air is sealed within the piston 101 and can only vent externally through a first vent 105. Furthermore, the air is able to move between the first section 102a and the second section 102b of the piston 101 through a second vent 106 and a third vent 107 via a connecting pipe 108 that is incorporated into a wall of the piston 101. The connecting pipe 108 allows controlled movement of the air between the first section 102a and the second section 102b.

The multi-directional valve controller 104 is one of a mechanical or an electronic controller, and overlies vents 105 and 106. The multi-directional valve controller 104 regulates flow of the air through the first vent 105 and the second vent 106 by opening and closing a first valve (not shown) and a second valve (not shown) in all possible combinations. The first valve opens the first section 102a to external air, and the second valve opens section 102a to the connecting pipe 108 that connects the first section 102a to the second section 102b. An upper end 108a of the connecting pipe 108 is connected to the multi-directional valve controller 104 and a lower end 108b connects to the distal end of the second section 102b. In an embodiment, the multi-directional valve controller is replaced by a dual bi-directional valve controller comprising four valves, the first two valves are same as the first valve and the second valve of the multi-directional valve controller 104. The first valve and the second valve are duplicated at a lower end 108b of the connecting pipe 108. The recoil direction of the piston 101 can be reversed using the dual bi-directional valve controller.

The reservoir section 102c is located below the second section 102b, and the air is ducted between the second section 102b and the reservoir section 102c through a retardation device 109 that retards velocity and/or volume of the flow of the air between the second section 102*b* and the reservoir section 102*c*. In an embodiment, the retardation device 109 is one of a bidirectional throttle valve or one or more mini turbines located at the bottom of the second section 102*b*. When one or more mini turbines are used as the retardation device 109 then electricity generated by the one or more mini turbines is used to power electronic devices including an electronic multi-directional valve controller.

In an embodiment, the multi-directional valve controller 104 is a mechanical rotary device. In another embodiment, the first valve and the second valve can be components of the multi-directional valve controller 104, and do not have to exist outside the multi-directional valve controller 104. The air flow in multi-directional valve controller 104 in different positions: 1) position A: the first valve is open and the second valve is closed; 2) position B: the first valve is closed and the second valve is opened; 3) position C: both the first valve and the second valve are closed; and 4) position D: both the first valve and the second valve are open. In an embodiment, the valves and are components of the multi-directional valve controller 104 attached to the piston 101.

Figure 2:
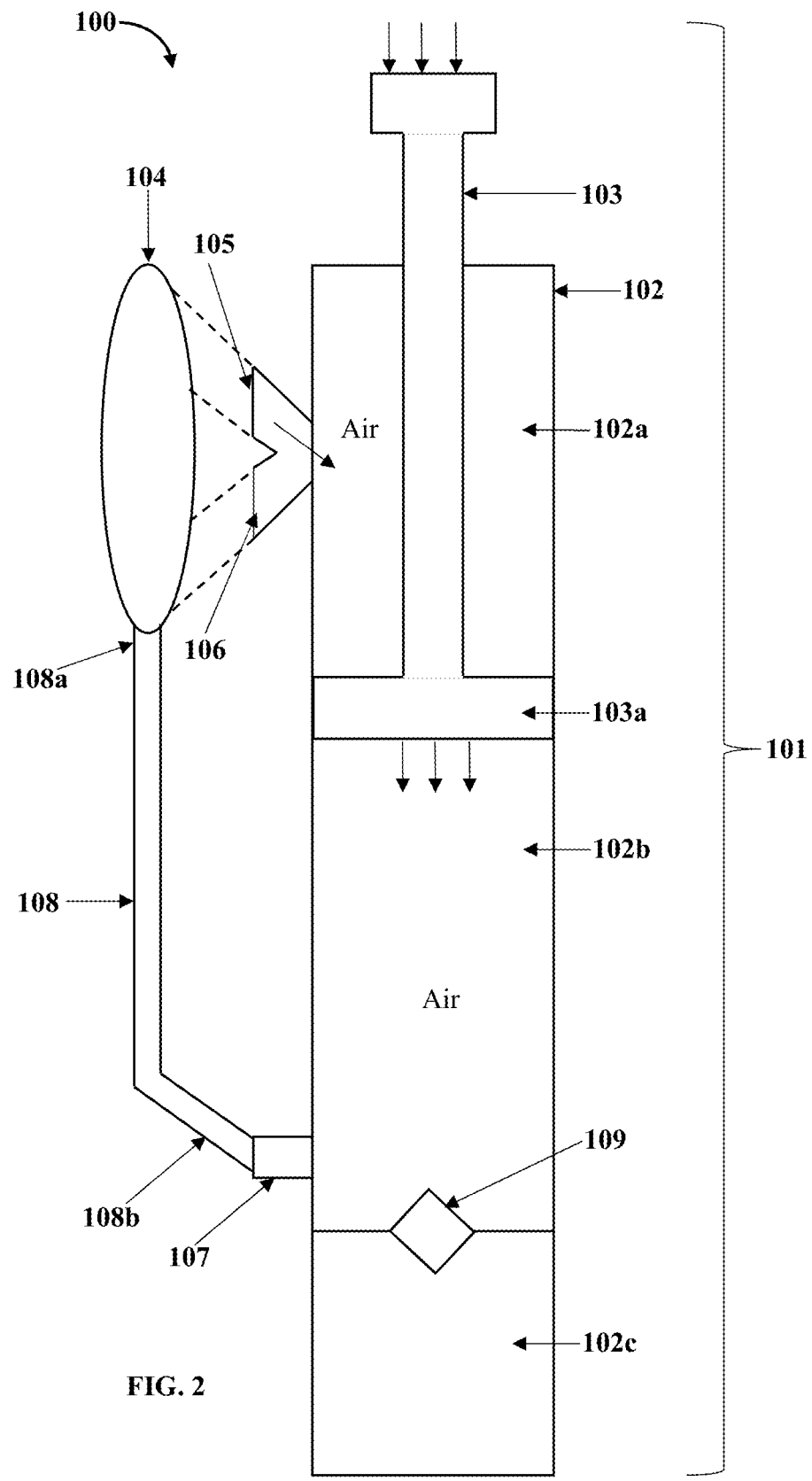
FIG. 2 exemplarily illustrates a schematic block diagram of an exemplary implementation of a system with multi-directional valve controller in position A.

FIG. 2 exemplarily illustrates a schematic block diagram of an exemplary implementation of a system 100 with multi-directional valve controller 104 in position A. In position A, when the first valve is opened and the second valve is closed, a force applied to the piston rod 103, compresses the air confined in the second section 102*b* of the cylinder 102, while simultaneously drawing fresh air into the first section 102*a* through the first valve. The compressed air in the second section 102*b* acts like a spring by storing the energy from the compression process. The stored energy creates a restoring force that pushes the piston head 103*a* of the piston 101 back in the reverse/opposite direction once the compression phase is complete. The force used/required to compress the piston head 103*a* is conserved and reused to assist in reverse movement the piston head 103*a*, reducing the amount of energy required for the subsequent reverse cycle of operations. Through this process, the overall efficiency of the piston 101 is improved and the energy loss is reduced. During piston 101 compression, the increase of pressure in the second section 102*b* is dampened by gradual filling of the reservoir 102*c* with the air through the retardation device 109. During piston 101 decompression, recoil is dampened by slow release of the air from the reservoir 102*c* into the second section 102*b* through the retardation device 109. Thus the initial recoil is reduced and a more uniform assistance force is maintained throughout the full range of piston 101 movement without reducing total recoil force.

Figure 3:
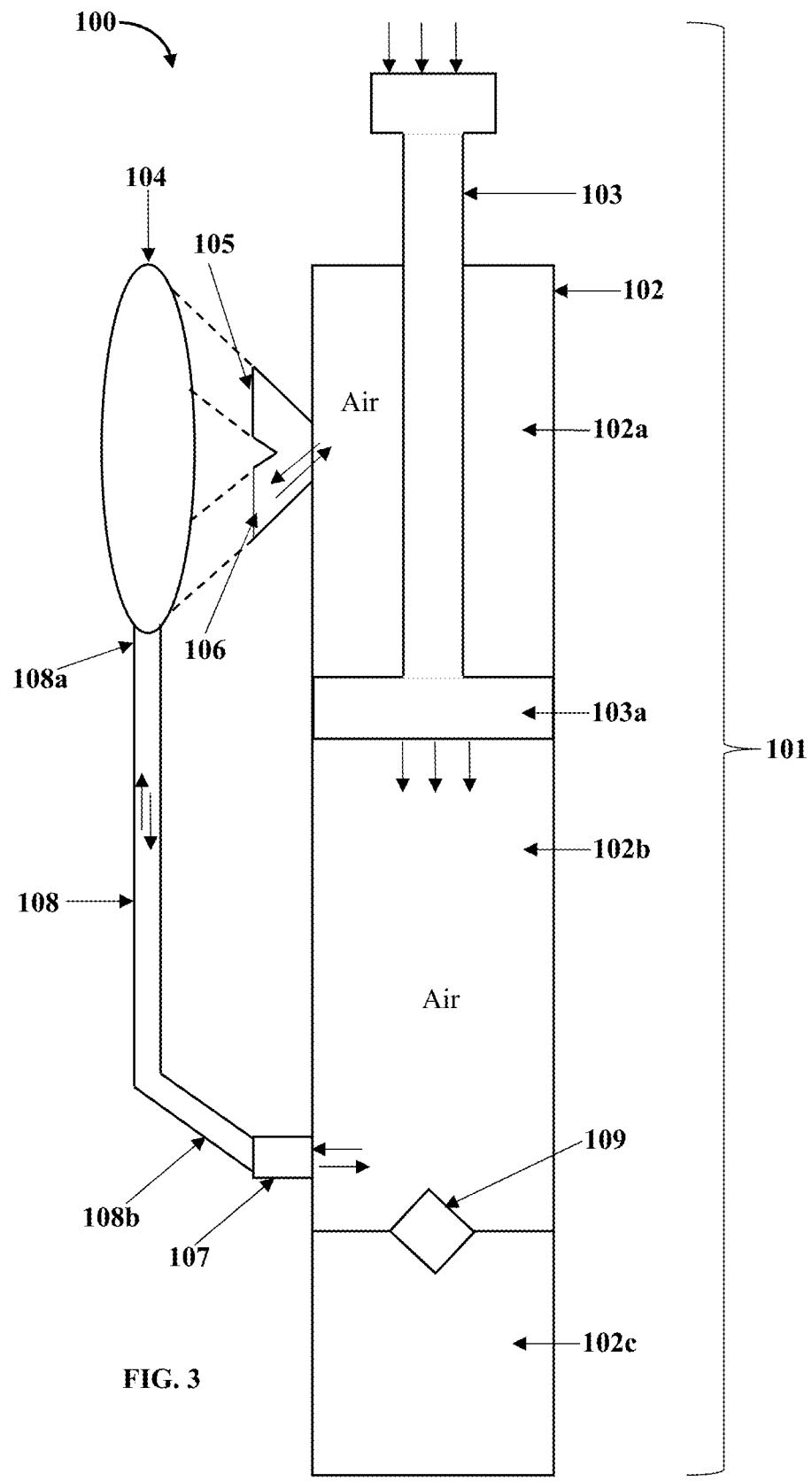
FIG. 3 exemplarily illustrates a schematic block diagram of an exemplary implementation of a system with multi-directional valve controller in position B.

FIG. 3 exemplarily illustrates a schematic block diagram of an exemplary implementation of a system 100 with multi-directional valve controller 104 in position B. In position B, when the second valve is opened and the first valve is closed, the piston 101 operates in a state where the pressure above and below the piston head 103*a* remains uniform during the piston 101 movement. The pressure above and below the piston head 103*a* is continuously equilibrated by the free flow of air through the connecting pipe 108, keeping the pressure in both the first section 102*a* and the second section 102*b* of the cylinder 102 constant. The air flows between the first section 102*a* and the second section 102*b* through the connecting pipe 108 via the second vent 106 at a proximal end 108*a* of the connecting pipe 108 and the third vent 107 at a distal end 108*b* of the connecting pipe 108. As a result, the piston head 103*a* movement is free and unhindered without recoil assistance. In this configuration, there is no pressure difference to either assist or resist the movement of piston 101. The previous pressure settings and recoil assistance can be resumed on demand by closing the second valve and opening the first valve when the piston head 103*a* is fully retracted.

Figure 4:
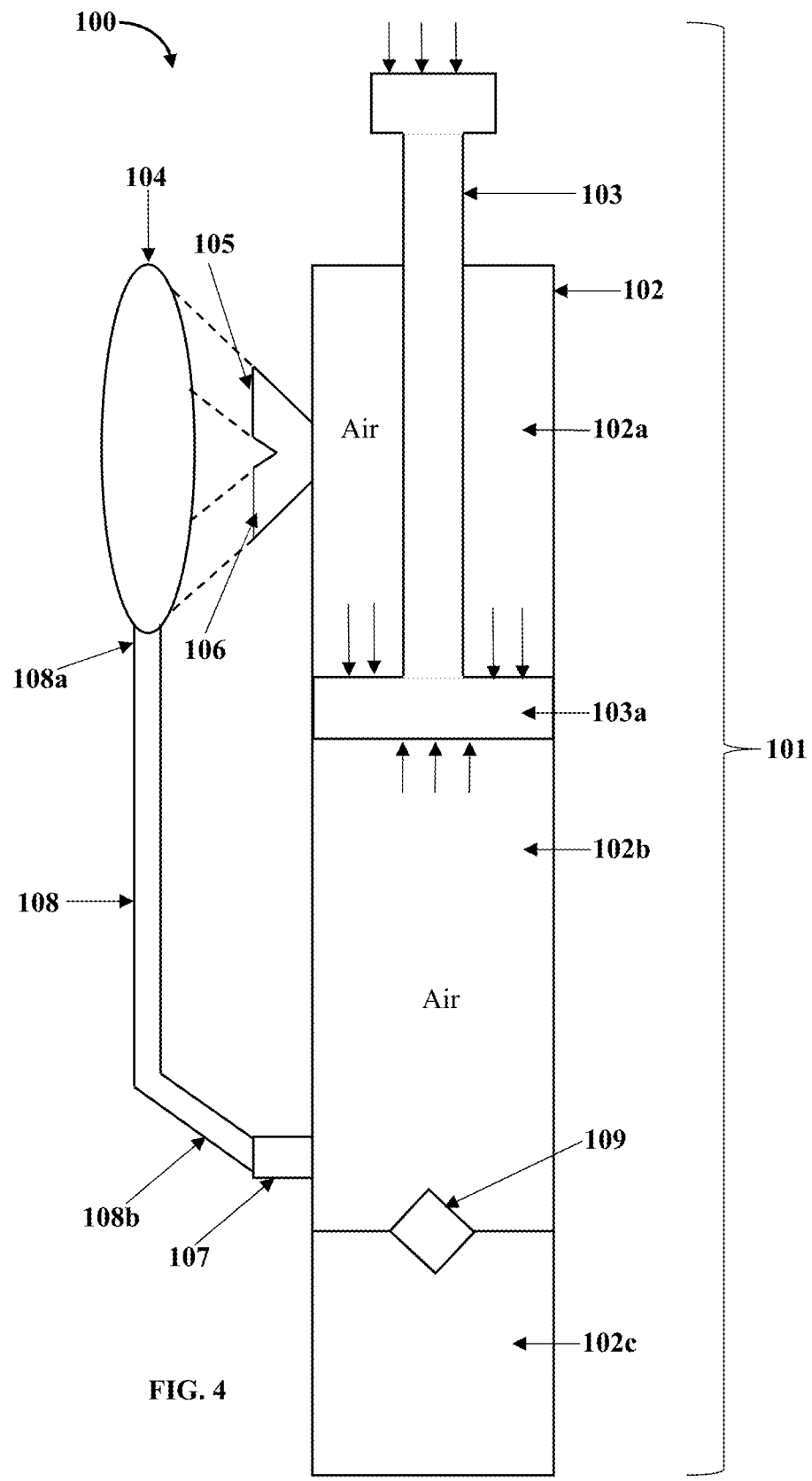
FIG. 4 exemplarily illustrates a schematic block diagram of an exemplary implementation of a system with multi-directional valve controller in position C.

FIG. 4 exemplarily illustrates a schematic block diagram of an exemplary implementation of a system 100 with multi-directional valve controller 104 in position C. In position C, when both the first valve 108 and the second valve 109 are closed, the piston head 103*a* movement in both directions is retarded, by vacuum effect in the first section 102*a*, and positive air pressure in the second section 102*b*. The combined effect of the negative pressure from the vacuum in the first section 102*a* and the positive pressure in the second section 102*b* causes the piston 101 movement in both directions is retarded.

Figure 5:
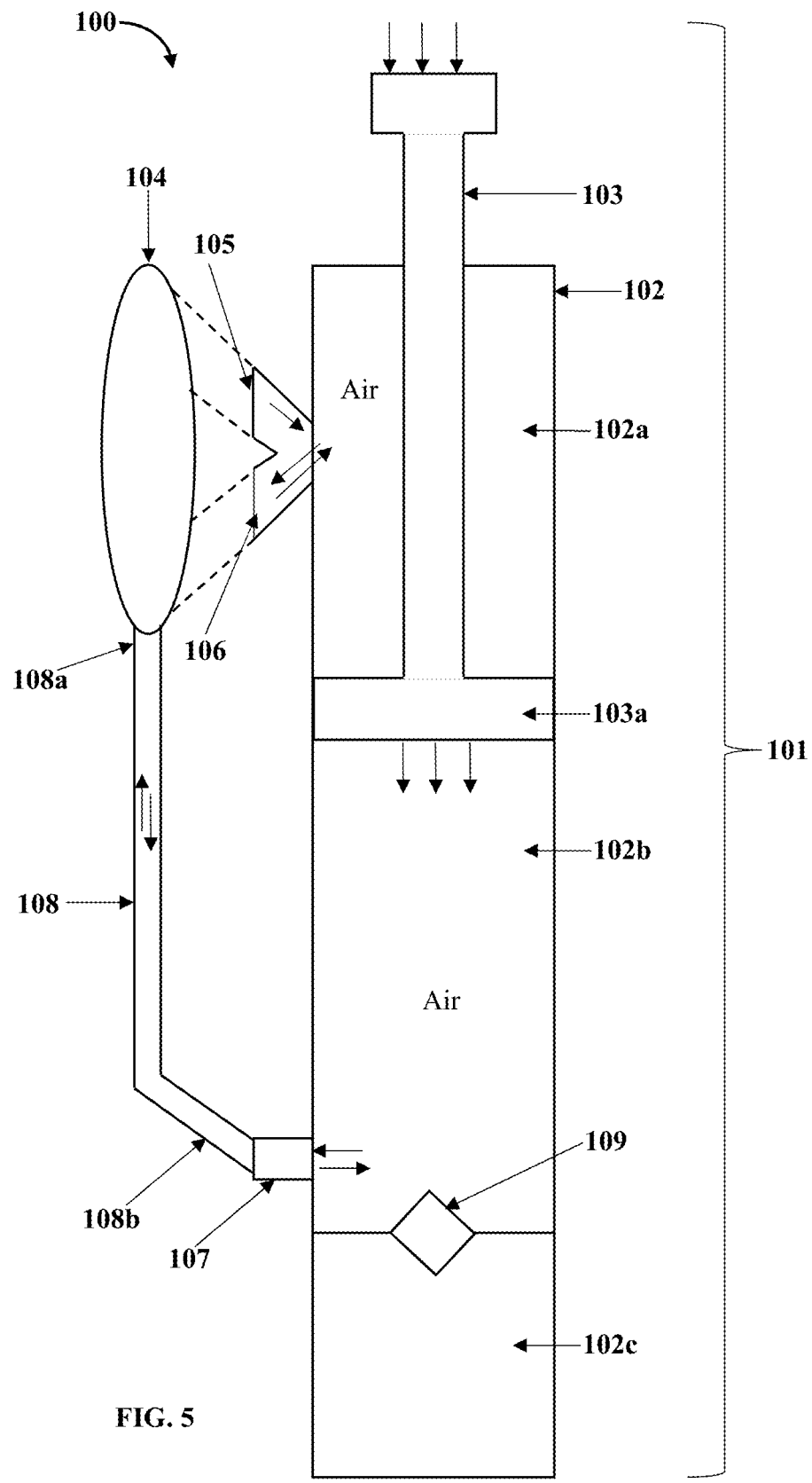
FIG. 5 exemplarily illustrates a schematic block diagram of an exemplary implementation of a system with multi-directional valve controller in position D.

FIG. 5 exemplarily illustrates a schematic block diagram of an exemplary implementation of a system 100 with multi-directional valve controller 104 in position D. In position D, when both the first valve 108 and the second valve 109 are opened, the first section 102*a* and the second section 102*b* are both depressurized to ambient pressure, and the piston head 103*a* movement is free with substantially no recoil assistance. The two valves 108 and 109 are opened when recoil is not required.

The recoil of the piston 101 is maximum at maximum compression, and decreases progressively with decompression. This varying recoil force is dampened by the slow release of air from reservoir 102*c*. During the piston head 103*a* compression, the expected rapid increase of pressure in the second section 102*b* is smoothened and dampened by the gradual flow of the air from the second section 102*b* into the reservoir 102*c* through the retardation device 109. Similarly, during the piston head 103*a* decompression, the rapid decrease of recoil force of the piston 101 is dampened by the slow release of the air from the reservoir 102*c* into the second section 102*b*. The retardation device 109 and the reservoir 102*c* serve to dampen the rapidly changing pressure through the full range of piston head movement 103*a*. Furthermore, the retardation device 109 reduces the initial recoil, and maintains a more uniform assistance force throughout the full range of the piston 101 recoil movement, without reducing the total recoil force.

The recoil force of the piston 101 is adjusted on demand by changing the pressure in the second section 102*b*. To increase the pressure in the second section 102*b*: First step: after full retraction of the piston head 103*a*, close the second valve and open the first vale, i.e., position A of the multi-directional valve controller 104. In this position, compression of the piston rod 103, depresses the piston head 103*a* resulting in progressive compression of the air in the second section 102*b*, while simultaneously drawing fresh air into the first section 102*a* through the first valve. Second step: after full piston head 103*a* compression, the first valve is closed and the second valve is opened, i.e., position B of the multi-directional valve controller 104. Position B results in the equilibration of air pressure above and below the piston head 103*a*. The piston rod 103 is then fully retracted. The piston head 103*a* movement within the cylinder 102 is substantially free of resistance as the air flows freely to the second section 102*b* through the connecting pipe 108. Third step: The piston head 103*a* is then fully retracted so that all the movable air is moved to the second section 102*b*.

Sequentially repeating the first, second, and third steps, will gradually pump air into the second section 102*b*. This will gradually increase the volume and pressure of the air in the second section 102*b* of the cylinder 102. The pump action is used to gradually increase both the volume and pressure of or air in the second section 102b to a desired level. By performing the first, second, and third steps, with partial compression of the piston 101, the pressure can be increased in smaller increments. The pump action thus allows for precise adjustments, allowing for fine tuning of the pressure in section 102b to attain optimal performance. In an embodiment, an imbedded air valve stem (not shown) is incorporated at the third vent 107 to monitor the pressure in the second section 102b by virtue of an inbuilt, or a portable pressure gauge. The air valve stem also provides an alternate method to depressurize the second section 102b. In another embodiment, when a portable air pump is available, then the air valve stem can be used to pressurize the second section 102b, thereby obviating the pressurization and depressurization steps 1 to 3.

To depressurize the piston 101, the pump action is reversed i.e., reversing the first and second steps. Depressurizing the piston 101 will allow gradual down regulation of pressure in the second section 102b. A gradual decrease of recoil assistance is achieved by reversing the pump action, thereby facilitating a gradual downregulation of the pressure in the second section 102b and a gradual on demand reduction of the recoil assistance. If this reversal of first and second steps, i.e., pump action, is continued below ambient pressure, then a vacuum will be created in the second section 102b that causes the piston head 103a to provide vacuum recoil in an opposite direction. Opening both first valve and the second valve, i.e., position D of the multi-directional valve controller 104 would abruptly depressurize the piston. In an embodiment, the increase in piston compression force can be further increased by switching the multi-directional valve controller 104 to position C while in full piston retraction. In this condition, the piston compression is retarded by both positive pressure in the second section 102b and the vacuum effect in the first section 102a. The increased piston compression force can thus be used to boost the recoil.

To retard the piston 101 movement in both directions when the piston 101 is in any position of compression, both the first valve and the second valve are closed, there will be an initial movement of the piston rod 103 and the piston head 103a to equilibrate pressure in the first section 102a and the second section 102b. During this process, the air is not flowing through the connecting pipe 108, consequently pressure equilibration can only be achieved by the piston head 103a movement. Once equilibrated, the movement of the piston head 103a is progressively retarded in either direction. As a result, the movement of the piston head 103a is limited/restricted in both directions. In an embodiment, this feature can be used to retard piston movement, especially when full excursion of the piston 101 is not desirable.

For example, after the piston is pressurized to the desired level, the second valve is closed and the first valve is opened i.e., position A of the multi-directional valve controller 104. Now if a force is applied to the piston rod 103 causing the piston 101 to undergo compression, the compression of the piston head 103a will result in a recoil force in the opposite direction. The force applied during the compression is conserved to boost movement of the piston head 103a in the opposite direction. The piston 101 functions as a recoil piston.

To disable Piston recoil, both the first valve and the second valve are opened, i.e., position D of the multi-directional valve controller 104, both the first and second valves are opened when recoil is not required.

In an embodiment, the system 100 for piston recoil pressure adjustment is configured for underwater usage by initially, adjusting the air pressure in the second section 102b of the piston 101 for under water use. Once the desired recoil pressure is reached, the second valve is closed and the first valve is opened. In this configuration when the system 100 for piston recoil pressure adjustment is deployed under water, the piston head 103a movement causes water to flow back and forth through first valve and into the first section 102a.

Figure 6:
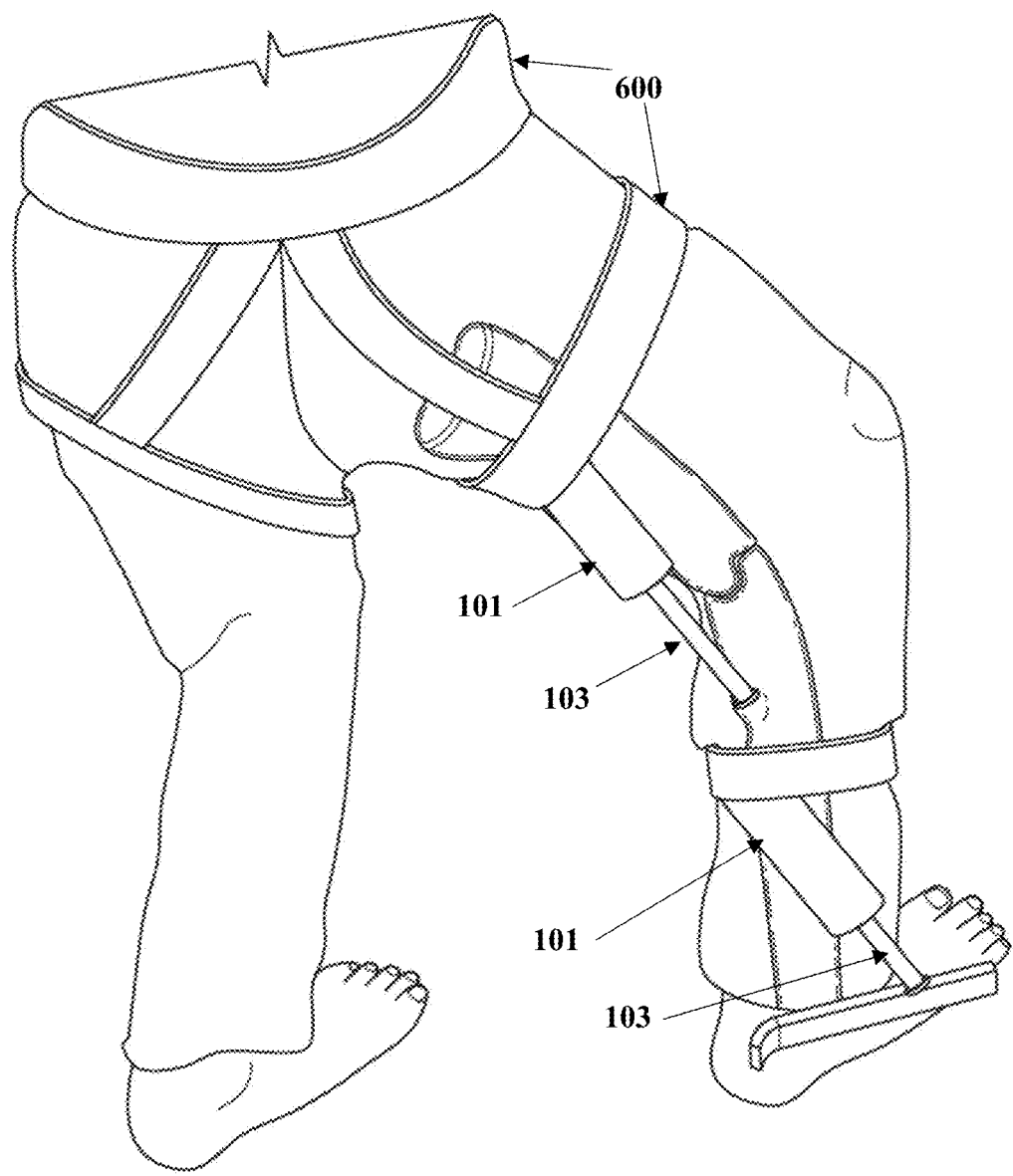
FIG. 6 exemplarily illustrates pistons positioned at joints of an exoskeleton.

FIG. 6 exemplarily illustrates pistons 101 positioned at the joints of an exoskeleton 600. The pistons 101 act as a power source for the exoskeleton 600. The pistons 101 are lightweight, substantially inexhaustible and allow easy real-time adjustment of the assistive force. Furthermore, the pistons 101 are integrated in to the exoskeleton 600 assist smooth and natural movements of the user wearing the exoskeleton 600, thereby reducing the physical strain, prevent injuries, and reducing fatigue.

Figure 7A:
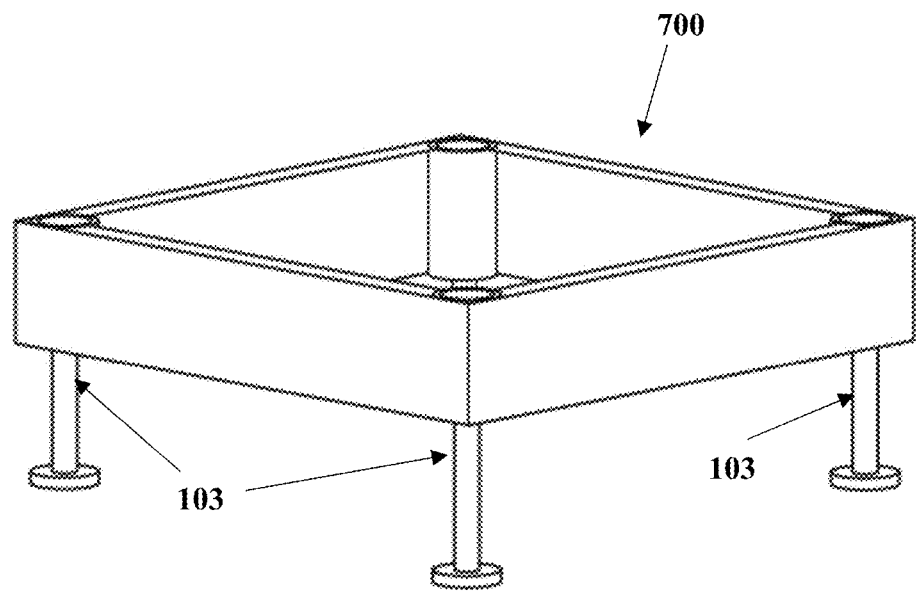
FIGS. 7A-7B exemplarily illustrates pistons positioned at four corners of a lifting tray.
Figure 7B:
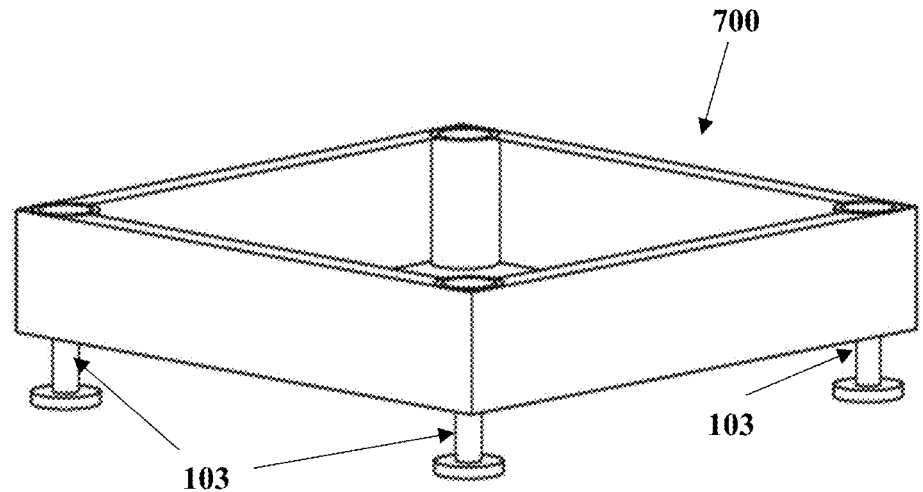

FIGS. 7A-7B exemplarily illustrates pistons 101 positioned at the four corners of a lifting tray 700. The piston rods 103 of each of piston 101 functions as support legs of the lifting tray 700. In unloaded state, the piston rods 103 are fully extended as exemplarily illustrated in FIG. 7A. When a heavy object (not shown) is placed into the lifting tray 700, the weight of the object causes the piston rods 103 to compress as exemplarily illustrated in FIG. 7B. Subsequently, when the heavy object is manually lifted from the lifting tray 700, the pistons' 101 recoil helps raise the lifting tray 700 back to its initial position. The pistons' 101 recoil assists in the lifting the heavy object, thereby reducing the physical strain on the worker, minimizing the possibility of low back injuries, and reducing fatigue of the employees. The lifting tray 700 efficiently assists with manual lifting tasks by utilizing the stored energy from the compressed pistons 101 to aid in lifting the object.

In an example, a pilot often ties the shoulder, waist and thigh straps to the seat while seated. During an emergency ejection, the feet of the pilot are mechanically drawn back to prevent injuries to a flailing leg. However, about fifty percent of pilots are injured during an emergency ejection from an aircraft. Furthermore, about thirty percent of these injuries result in disabilities that limit a full recovery. In another embodiment, a piston 101 is embedded in an aircraft's pilot seat. The piston 101 is embedded in the pilot seat and restrained by clamps that are released during seat ejection. This embodiment further comprises a leg retraction system that additionally activates the calf buckles to snap around the calf and ankle of the pilot. In addition, the leg retraction system also activates strap tensioners. During ejection, releasing the pilot from the seat releases the pistons 101 that partially extend the hips, knees, and plantar flexes the ankles. At the moment of impact, the incremental compression of the pistons 101 cushion the impact and reduce injuries to the ankles, knees, hips, and back. The slow compression of the pistons 101 at impact act akin to the crumple zone of a car during a crash.

A method for piston recoil pressure adjustment is disclosed. The method provides a system 100 for on demand piston 101 recoil pressure adjustment. The system 100 comprises a piston 101 and a multi-directional valve controller 104. The piston 101 includes a cylinder 102 and piston rod 103. The variable space above a piston head 103a is referred to as a first section 102a, and a second section 102b refers to the variable space below the piston head 103a. The air is sealed within the piston 101 and can only vent externally through a first vent 105, and between the first section 102a and the second section 102b through a second vent 106 and a third vend 107 via a connecting pipe 108 that is incorporated into a wall of the piston 101. The reservoir section 102c is below the second section 102b, wherein the air is ducted between the second section 102b and the reservoir section 102c through a retardation device 109 that retards velocity and or volume of flow of the air between the second section 102b and the reservoir section 102c. The retardation device 109 is one of a bidirectional throttle valve or one or more mini turbines located at the bottom of the second section 102b. When one or more mini turbines are used as air retardation device 109 then electricity generated by the one or more mini turbines is used to power electronic devices including an electronic multi-directional valve controller. During piston head 103a compression, expected rapid increase of pressure in the second section 102b is smoothened and dampened by gradual filling of the reservoir 102c through the retardation device 109, and reversely, during piston head 103a decompression, the rapid decrease of recoil force is dampened by slow release of the air from the reservoir 102c into the second section 102b. The retardation device 109 serves to dampen the rapidly changing pressure through the full range of piston head 103a movement, and there is no reduction in the total recoil force.

The multi-directional valve controller 104 is one of a mechanical or an electronic controller. In an embodiment, the multi-directional valve controller 104 is replaced by a dual bi-directional valve controller comprising four valves, the first two valves are same as the first valve and the second valve of the multi-directional valve controller 104. The first valve and the second valve are duplicated at a lower end 108b of the connecting pipe 108. The recoil direction of the piston 101 can be reversed using the dual bi-directional valve controller. The direction of the recoil assistance of the piston 101 can be reversed as needed. The multi-directional valve controller 104 overlies the first vent 105 and the second vent 106, and regulates airflow through the first vent 105 and the second vent 106 by opening and closing a first valve and a second valve in all possible combinations: A) opening the first valve and closing the second valve and compressing the piston head 103a compresses the air in the second section 102b, and draws fresh air into the first section 102a. The compressed air in the second section 102b acts as a spring to force the piston head 103a in the reverse direction. The force required to compress the piston head 103a is conserved to assist in reverse movement of the piston head 103a and thereby assists in overcoming opposing forces such as gravitational or fluid dynamic forces during recoil; B) opening the second valve and closing the first valve, whereby pressure above and below the piston head 103a is continuously equilibrated by free flow of the air through the connecting pipe 107, the piston head 103a movement is free and unhindered without recoil assistance. The pressure setting in combination A and the recoil assistance can be resumed on demand by closing the second valve and opening the first valve when the piston head 103a is fully retracted; C) closing both the first valve and the second valve, whereby the piston head 103a movement in both directions is severely retarded due to vacuum effect in the first section 102a and positive air pressure in the second section 102b; and D) opening both the first valve and the second valve, whereby the first section 102a and the second section 102b are both rapidly depressurized to ambient pressure, and the piston head 103a movement is free with no recoil assistance.

The recoil force of the piston 101 is adjusted on demand by changing the pressure in the second section 102b. The pressure in the second section 102b is increased by: First step: after full retraction of the piston head 103a, the second valve is closed, and the first valve is opened, the piston head 103a is then depressed, whereby depressing the piston head 103a results in progressive compression of the air in the second section 102b, associated with fresh air being drawn into the first section 102a through the first valve 108; Second step: after full piston head 103a compression, first valve is closed and the second valve is opened, whereby equilibration of the air above and below the piston head 103a is achieved and piston head 103a movement is free of resistance as the air flows freely through the connecting pipe 108; step 3: the piston head 103a is then fully retracted so that all movable air is in the second section 102b; and sequentially repeating the steps 1 to 3 results in pumping of air into the second section 102b, thereby permitting the gradual increase of air pressure in the second section 102b to a desired level, wherein additional small incremental increase of the pressure in the second section 102b is achieved by performing the steps 1 to 3 with partial piston compression, wherein an imbedded air valve stem is incorporated at the third vent 107 to monitor the pressure in the second section 102b by virtue of an inbuilt or a portable pressure gauge; wherein the air valve stem provides an alternate method to depressurize the second section 102b; and wherein a portable air pump is used to pressurize the second section 102b, thereby obviating the pressurization and depressurization steps 1 to 3.

A gradual decrease of recoil assistance is achieved by reversing steps 1 and 2, thereby facilitating a gradual down-regulation of the pressure in the second section 102b and a gradual on demand reduction of the recoil assistance. If the reverse pumping action i.e., reversal of steps 1 and 2, is continued below ambient pressure, then a vacuum will be created in the second section 102b that causes the piston head 103a to provide vacuum recoil in an opposite direction. The movement of the piston head 103a can be retarded in both directions on demand by closing the first valve and the second valve resulting in retardation of the piston 101 movement in any direction by the positive pressure in the second section 102b and vacuum effect in the first section 102a. On demand power boost is additionally provided as further compression of the piston head 103a will result in a marked increase of the recoil force as a result of negative pressure in the first section 102a.

In an embodiment, the method further comprises configuring the piston recoil pressure adjustment for underwater usage by: adjusting the air pressure in the second section 102b for under water use; closing the second valve and opening the first valve. In this configuration when the system 100 for piston recoil pressure adjustment is deployed under water, movement of the piston head 103a causes water to flow back and forth through the first valve and into the first section 102a.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments herein extend to all functionally equivalent structures, methods, systems, and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope of the embodiments disclosed herein.

We claim:

1. A system for piston recoil pressure adjustment, comprising:
a piston, comprising:
a first section above a piston head;
a second section below the piston head;
a reservoir section below the second section, wherein the air is ducted between the second section and the reservoir section through a retardation device that retards velocity and/or volume of the airflow between the second section and the reservoir section; and
a piston rod configured to move the piston head within the first and second sections of the piston, wherein air is sealed within the piston and can only vent externally through a first vent, and between the first and second section through a second vent via a connecting pipe that is incorporated into a wall of the piston; and
a multi-directional valve controller, wherein the multi-directional valve controller is one of a mechanical or an electronic controller, wherein the multi-directional valve controller overlies the first vent and the second vent, and wherein the multi-directional valve controller regulates airflow through the first vent and the second vent by opening and closing a first valve and a second valve in all possible combinations.

2. The system of claim 1, wherein the retardation device is one of a bidirectional throttle valve or one or more mini turbines located at the bottom of the second section.

3. The system of claim 2, wherein when one or more mini turbines are used as retardation device then electricity generated by the one or more mini turbines is used to power electronic devices including an optional electronic multi-directional valve controller.

4. The system of claim 1, wherein during piston head compression, rapid increase of pressure in the second section is smoothened and dampened by gradual filling of the reservoir through the retardation device, and reversely, during piston head decompression, the rapid decrease of recoil force is dampened by slow release of the air from the reservoir into the second section, wherein the retardation device serves to dampen the changing pressure through the full range of piston head movement, and wherein there is no reduction in the total recoil force.

5. The system of claim 4, wherein the recoil force is adjusted on demand by changing the pressure in the second section, wherein the pressure in the second section can be increased by:
step 1: after full retraction of the piston head, the second valve is closed, and the first valve is opened, the piston head is then depressed, whereby depressing the piston head results in progressive compression of the air in the second section, associated with fresh air being drawn into the first section through the first valve;
step 2: after full piston head compression, first valve is closed and the second valve is opened, whereby equilibration of air above and below the piston head is achieved and piston head movement is free of resistance as the air flows freely through the connecting pipe; and
step 3: the piston head is then fully retracted so that all movable air is in the second section;
sequentially repeating the steps 1 to 3 results in pumping of air into the second section, thereby permitting the gradual increase of air pressure in the second section to a desired level, wherein additional small incremental increase of the pressure in the second section is achieved by performing the steps 1 to 3 with partial piston compression, wherein an imbedded air valve stem is incorporated at the third vent to monitor the pressure in the second section by virtue of an inbuilt or a portable pressure gauge; wherein the air valve stem provides an alternate method to depressurize the second section; and wherein a portable air pump is used to pressurize the second section, thereby obviating the pressurization and depressurization steps 1 to 3.

6. The system of claim 5, wherein a gradual decrease of recoil assistance is achieved by reversing the steps set forth in claim 5, thereby facilitating a gradual downregulation of the pressure in the second section and a gradual on demand reduction of the recoil assistance, and wherein if this reversal of steps is continued below ambient pressure, then a vacuum will be created in the second section that causes the piston head to provide vacuum recoil in an opposite direction.

7. The system of claim 5, wherein movement of the piston head can be retarded in both directions on demand by closing the first valve and the second valve resulting in retardation of the piston movement in either direction by the positive pressure in the second section and vacuum effect in the first section, and wherein on demand power boost is additionally provided as further compression of the piston head will result in a marked increase of the recoil force as a result of negative pressure in the first section.

8. The system of claim 1, wherein the first valve and the second valve along with the multi-directional valve controller are duplicated at the lower end of the connecting pipe, whereby the direction of recoil assistance of the piston can be reversed as needed.

9. The system of claim 1 configured for underwater usage by:
adjusting the air pressure in the second section for under water use; and
closing the second valve and opening the first valve;
wherein, when the system for piston recoil pressure adjustment is deployed under water, the piston head movement causes water to flow back and forth through the first valve and into the first section.

10. A system for piston recoil pressure adjustment, comprising:
a piston, comprising:
a first section above a piston head;
a second section below the piston head; and
a piston rod configured to move the piston head within the first and second sections of the piston, wherein air is sealed within the piston and can only vent externally through a first vent, and between the first and second section through a second vent via a connecting pipe that is incorporated into a wall of the piston; and
a multi-directional valve controller, wherein the multi-directional valve controller is one of a mechanical or an electronic controller, wherein the multi-directional valve controller overlies the first vent and the second vent, and wherein the multi-directional valve controller regulates airflow through the first vent and the second vent by opening and closing a first valve and a second valve in all possible combinations;

wherein when the first valve is open and the second valve is closed, compression of the piston head compresses the air in the second section, and draws fresh air into the first section, wherein compressed air in the second section acts as a spring to force the piston head in the reverse direction, and wherein the force required to compress the piston head is conserved to assist in reverse movement of the piston head.

11. The system of claim 10, wherein when the second valve is open and the first valve is closed, pressure above and below the piston head is continuously equilibrated by free flow of the air through the connecting pipe via the second vent at a proximal end of the connecting pipe and the third vent at a distal end of the connecting pipe, wherein the piston head movement is free and unhindered without recoil assistance, and wherein previous pressure setting and the recoil assistance can be resumed on demand by closing the second valve and opening the first valve when the piston head is fully retracted.

12. The system of claim 11, wherein when both the first valve and the second valve are closed, the piston head movement in both directions is retarded due to vacuum effect in the first section and positive air pressure in the second section.

13. The system of claim 12, wherein when both the first valve and the second valve are opened, the first section and the second section are both depressurized to ambient pressure, and the piston head movement is free with no recoil assistance.

14. A method for piston recoil pressure adjustment, providing a system for on demand piston recoil pressure adjustment, comprising:
a piston, comprising:
a first section above a piston head;
a second section below the piston head; and
a piston rod is configured to move the piston head within the first and second sections of the piston, wherein air is sealed within the piston and can only vent externally through a first vent, and between the first and second section through a second vent and a third vent via a connecting pipe that is incorporated into a wall of the piston; and
a multi-directional valve controller, wherein the multi-directional valve controller is one of a mechanical or an electronic controller, wherein the multi-directional valve controller overlies the first vent and the second vent, and wherein the multi-directional valve controller regulates airflow through the first vent and the second vent by opening and closing a first valve and a second valve in all possible combinations;
opening the first valve and closing the second valve and compressing the piston head compresses the air in the second section, and draws fresh air into the first section, wherein compressed air in the second section acts as a spring to force the piston head in the reverse direction, and wherein the force required to compress the piston head is conserved to assist in reverse movement of the piston head;
opening the second valve and closing the first valve, whereby pressure above and below the piston head is continuously equilibrated by free flow of the air through the connecting pipe, wherein the piston head movement is free and unhindered without recoil assistance, and wherein previous pressure setting and the recoil assistance can be resumed on demand by closing the second valve and opening the first valve when the piston head is fully retracted;
closing both the first valve and the second valve, whereby the piston head movement in both directions is retarded due to vacuum effect in the first section and positive air pressure in the second section; and
opening both the first valve and the second valve, whereby the first section and the second section are both depressurized to ambient pressure, and the piston head movement is free with no recoil assistance.

15. The method of claim 14, further comprising a reservoir section below the second section, wherein the air is ducted between the second section and the reservoir section through a retardation device that retards velocity and or volume of the airflow between the second section and the reservoir section.

16. The method of claim 15, wherein the retardation device is one of a bidirectional throttle valve or one or more mini turbines located at the bottom of the second section.

17. The method of claim 16, wherein when one or more mini turbines are used as retardation device then electricity generated by the one or more mini turbines is used to power electronic devices including an electronic multi-directional valve controller.

18. The method of claim 15, wherein during piston head compression, increase of pressure in the second section is smoothened and dampened by gradual filling of the reservoir through the retardation device, and reversely, during piston head decompression, the decrease of recoil force is dampened by slow release of the air from the reservoir into the second section, wherein the retardation device serves to dampen the changing pressure through the full range of piston head movement, and wherein there is no reduction in the total recoil force.

19. The method of claim 18, wherein the recoil force is adjusted on demand by changing the pressure in the second section, wherein the pressure in the second section can be increased by:
step 1: after full retraction of the piston head, the second valve is closed, and the first valve is opened, the piston head is then depressed, whereby depressing the piston head results in progressive compression of the air in the second section, associated with fresh air being drawn into the first section through the first valve;
step 2: after full piston head compression, first valve is closed and the second valve is opened, whereby equilibration of air above and below the piston head is achieved and piston head movement is free of resistance as the air flows freely through the connecting pipe;
step 3: the piston head is then fully retracted so that all movable air is in the second section; and
sequentially repeating the steps 1 to 3 results in pumping of air into the second section, thereby permitting the gradual increase of air pressure in the second section to a desired level, wherein additional small incremental increase of the pressure in the second section is achieved by performing the steps 1 to 3 with partial piston compression, wherein an air valve stem is incorporated at the third vent to monitor the pressure in the second section by virtue of an inbuilt or a portable pressure gauge; wherein the air valve stem provides an alternate method to depressurize the second section; and wherein a portable air pump is used to pressurize the second section, thereby obviating the pressurization and depressurization steps 1 to 3.

20. The method of claim 19, wherein a gradual decrease of recoil assistance is achieved by reversing the steps set forth in claim 19, thereby facilitating a gradual downregulation of the pressure in the second section and a gradual on demand reduction of the recoil assistance, and wherein if this reversal of steps is continued below ambient pressure, then a vacuum will be created in the second section that causes the piston head to provide vacuum recoil in an opposite direction.

21. The method of claim 20, wherein movement of the piston head can be retarded in both directions on demand by closing the first valve and the second valve resulting in retardation of the piston movement in either direction by the positive pressure in the second section and vacuum effect in the first section, and wherein on demand power boost is additionally provided as further compression of the piston head will result in a marked increase of the recoil force as a result of negative pressure in the first section.

22. The method of claim 15, wherein the first valve and the second valve along with the multi-directional valve controller are duplicated at the lower end of the connecting pipe, whereby the direction of the recoil assistance of the piston can be reversed as needed.

23. The method of claim 14, further comprising:
configuring the piston recoil pressure adjustment for underwater usage by:
adjusting the air pressure in the second section for under water use; and
closing the second valve and opening the first valve;
wherein, when the system for piston recoil pressure adjustment is deployed under water, the piston head movement causes water to flow back and forth through the first valve and into the first section.

* * * * *